United States Patent [19]

Dorman et al.

[11] 4,254,331

[45] Mar. 3, 1981

[54] CALIBRATION CIRCUIT FOR FIBER OPTIC PROXIMITY INSTRUMENT

[75] Inventors: Richard A. Dorman, Troy; Curtis D. Kissinger, Gloversville, both of N.Y.

[73] Assignee: Mechanical Technology Incorporated, Latham, N.Y.

[21] Appl. No.: 6,654

[22] Filed: Jan. 26, 1979

[51] Int. Cl.³ .............................................. G01J 1/32
[52] U.S. Cl. .................................... 250/205; 250/227
[58] Field of Search ............... 250/205, 209, 214, 227; 315/151, 155

[56] References Cited

U.S. PATENT DOCUMENTS

| | | | |
|---|---|---|---|
| 3,327,584 | 6/1967 | Kissinger | 250/227 |
| 3,601,613 | 8/1971 | Hock | 250/205 |
| 3,919,546 | 11/1975 | Lutus | 250/205 |
| 3,931,513 | 1/1976 | Germain | 250/205 |
| 4,009,387 | 2/1977 | Nuver | 315/151 |

*Primary Examiner*—David C. Nelms
*Attorney, Agent, or Firm*—Joseph V. Claeys; John M. Neary

[57] ABSTRACT

A fiber optic proximity measuring instrument for measuring dynamic changes in the gap between a probe tip and a target includes a light source, two sensors for measuring reflected light and lamp brightness, and a light conducting cable for transmitting light to the target and conducting light reflected from the target back to the reflected light sensor. The lamp intensity is set by a brightness control during setup to produce a mean level of reflected light intensity, and then is automatically regulated to maintain an equal mean intensity at the reflected light sensor despite changes in target reflectivity and cable light conductance.

4 Claims, 2 Drawing Figures

CALIBRATION CIRCUIT FOR FIBER OPTIC PROXIMITY INSTRUMENT

BACKGROUND OF THE INVENTION

This invention relates to proximity instruments and, more particularly, to a calibration circuit for a fiber optic proximity instrument having automatic adjustments for changes in the intensity of the reflected light.

Fiber optic proximity probes are devices which use a light beam transmitted from a light source by way of a bundle of light conducting optical fibers from a light source to a target. The light is reflected off the target and returned along other optical fibers in the bundle back to a light intensity sensor in the instrument. The intensity of the returning light is a function of the distance between the proximity probe tip and the target, so the output of the light sensor can be a very precise measure of that distance, or more importantly, changes in that distance.

Because of variations in certain operating parameters such as surface reflectivity of the target, light intensity output of the light source, transmission efficiency of the fiber optic bundle, and other factors which influence the intensity of the light transmitted, reflected, returned and sensed, it is necessary to readjust the instrument if any one of these factors are changed during operation. Although this readjustment is a simple and fast procedure, and is cause for no concern in most situations, there are certain applications in which the need to readjust the instrument for each use is an unacceptable requirement, for example, where the instrument is in an inaccessible location or where its readings must be available continuously or at unpredictable intervals. In certain of these installations, the instrument probe is permanently mounted relative to a target and the mean gap between probe and target is constant. In such permanent situations it would be necessary to provide correction for errors due to degradation of the optical light path transmission efficiency caused by such factors as optical fiber breakage, debris on the face of the transducer, and variations in the surface reflectivity of the target.

SUMMARY OF THE INVENTION

Accordingly, it is an object of this invention to provide a calibration circuit for an improved optical proximity measuring instrument, for use in situations wherein the mean gap between the probe and the target is constant, which automatically compensates for changes in the intensity of the light beam. The output sensitivity of the instrument is essentially independent of the target surface reflectivity and it automatically compensates for factors which influence the transmission of light through the system, such as optical fiber breakage and debris on the face of the probe. It also automatically corrects for dimming of the light source over an extended period of time.

These and other objects of the invention are attained in an embodiment having a bundle of light conducting optical fibers, a portion of which transmit light from a light source to a target and the remainder of which return the light reflected from the target back to a light sensor. Since the mean gap between the tip of the proximity probe and the target is constant, a light intensity regulator system is employed to maintain the DC level of light as seen by the receiving fibers at a constant value so the desired slope correction can be obtained independently of the surface reflectivity. The time constant of the lamp intensity regulator system is large, e.g. on the order of 1 second, so the vibration displacement of the target can be measured over a broad range of frequency. The reference by which the light intensity is maintained is a voltage source which is set when the instrument is first installed and calibrated in a step-up mode, and is duplicated in an operating mode circuit during operation.

DESCRIPTION OF THE DRAWINGS

The invention and its attendant objects and advantages will become better understood by reference to the following description of the preferred embodiment when read in conjunction with the following drawings, wherein.

DESCRIPTION OF THE PREFERRED EMBODIMENT

Figure 1:
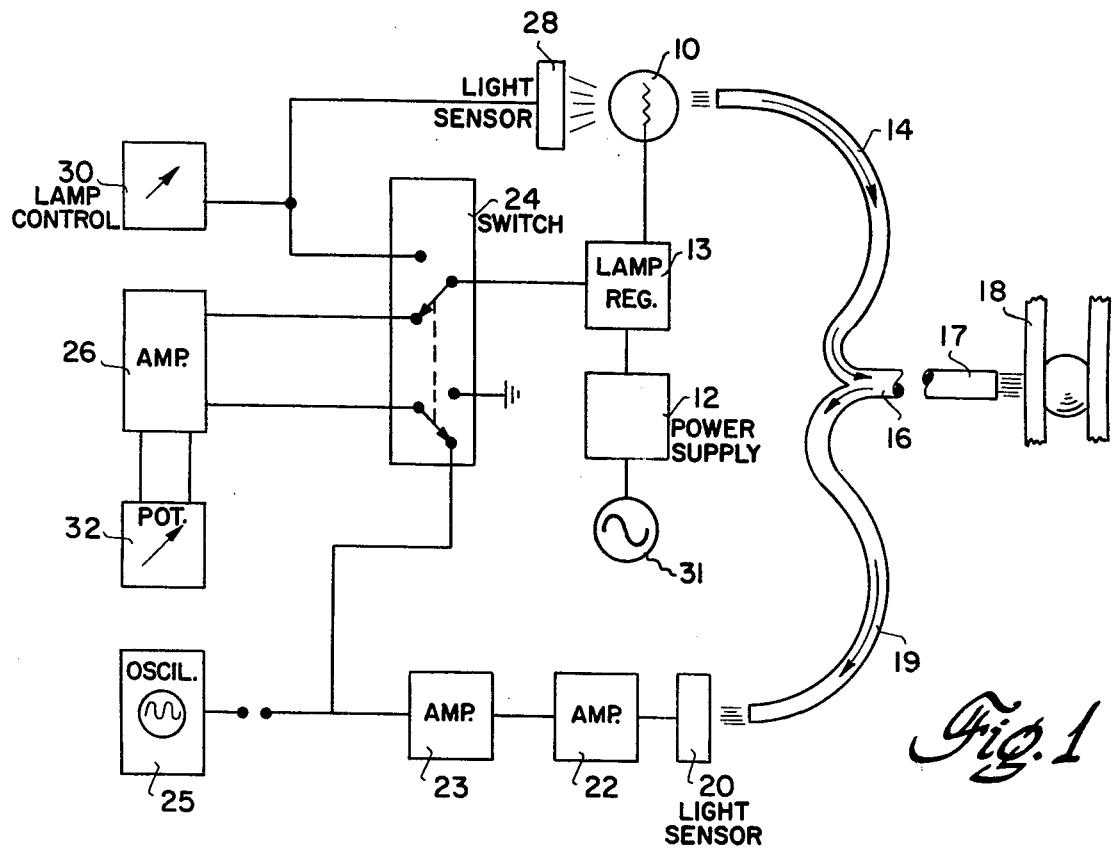
FIG. 1 is a schematic diagram of a fiber optic proximity sensor made in accordance with the invention.

Referring now to the drawings wherein like reference characters designate identical or corresponding parts, and more particularly to FIG. 1 thereof, a fiber optic proximity instrument is shown having a light source such as a lamp 10 powered by a power supply 12 that receives power from the power source 31 and regulated by a lamp regulator 13. Light from the lamp 10 is conducted along one branch 14 of a fiber optic light transmitting cable 16 to the surface of a target 18. The fiber optic light transmitting cable is the same as that shown in FIG. 1 of U.S. Pat. No. 3,327,584 issued to C. D. Kissinger on June 27, 1967, the entire disclosure of which is incorporated by reference herein.

Light is reflected from the target 18 and is picked up by the return fibers in the return branch 19 of the light transmitting cable 16, and conducted to a light sensor 20 which generates an electrical signal proportional to the intensity of the light returned along branch 19 of the light transmitting cable 16. The signal from sensor 20 is amplified by a sensor signal amplifier 23 and an output signal amplifier 23, and is conducted to a recording or indicating device such as the oscilliscope 25 to indicate the amplitude and frequency of the vibration of the target 18.

Figure 2:
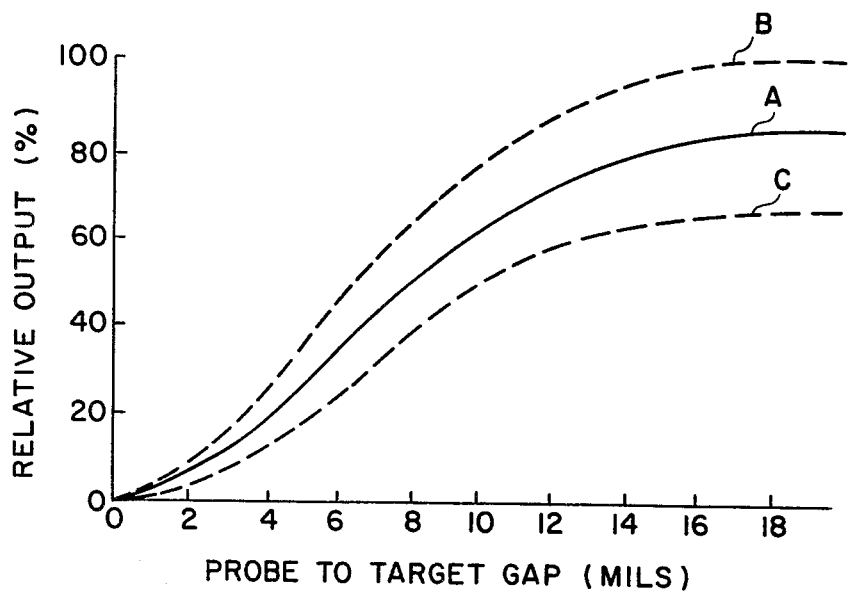
FIG. 2 is a graph showing automatic adjustments in light output to correct for changes in light beam intensity.

The normal operating range of the instrument is along the linear portion of the performance curve A shown in FIG. 2, that is, over a probe-to-target gap range of about 0.003 to 0.009 inches. In use, the instrument probe is fixed to a support and spaced about 0.006 inches from the target. The intensity of the reflected light thus varies linearly with the variation in the gap, within the linear range of the curve.

The instrument disclosed in the aforesaid '584 patent must be adjusted prior to each use to assure that it is operating on the linear portion of the characteristic curve, and that the light intensity is correlated with the probe-to-target gap. Otherwise, if the target reflectivity or light transmission efficiency has increased or decreased since the previous use, the characteristic curves B and C will be steeper and shallower, respectively, than the normalized curve A, so the results will be false, not only absolutely but also relative to each other.

The adjustment is accomplished by moving the probe toward and away from the target until the position is found which results in the maximum reflected light intensity. The lamp intensity is adjusted to give a reading at the top of the scale. The probe position is then reset to give a reading of about 40% on the scale, which is about midpoint on the linear portion of the curve.

In situations where the mean probe-to-target gap is constant, it is possible to eliminate the need to readjust the instrument each time it is used. Although the readjustment is very simple and takes only a few seconds, it is very desirable to eliminate the necessity for it in situations where the probe is in an inaccessible location or when its readings must be continuously available. An example of such a situation is in rolling element bearing analysis and monitoring applications wherein the probe will normally be permanently installed radially facing the outer bearing race, or when multiple instruments are installed in multiple locations to monitor all the critical bearing in the system so that it would be impractical to readjust the instrument for each use. Rolling element bearing monitoring and analysis uses a fiber optic proximity instrument to measure the amplitude and frequency of surface expansion traveling waves which travel around the bearing race. These surface expansions, caused by the force exerted by the rolling elements as they roll around the race, can have an amplitude on the order of 80 microinches. The sensitivity of this instrument is on the order of 1 microinch, so the precise waveform of the passing traveling wave can be examined, and this examination can reveal much about the condition of the bearing, as described by Gerald J. Philips in "A New Technology for Bearing Performance Monitoring", NBS Special Publication 436 (1975); and "Bearing Performance Investigations Through Speed Ratio Measurements", ASLE 78-AM-1A-2 (1978).

To attain the self-calibration capability, the signal from the output signal amplifier 23 is also conducted through a switch 24 and an amplifier 26 to the lamp intensity regulator 13. The lamp intensity regulator 13 adjusts the intensity of the lamp 10 to compensate for changes in target surface reflectivity and/or transmission efficiency of the light conducting cable 16 and other long-term factors which would affect the intensity of the light beam returned along the branch 19. The time constant of the lamp intensity regulator 13 is relatively long, for example, on the order of one second, so that only "long term" factors affect the light intensity regulator, but vibration or other moderate or high-frequency movement of the target 18 does not. For this reason, the time constant of the regulator should be at least about ten times greater than the period of the "long term" factors which the instrument is designed to ignore. However, the automatic lamp intensity regulator can be used only in situations where the mean gap between the probe tip and the target 18 remains constant. If the mean gap changes, the lamp intensity regulator 13 will adjust the lamp intensity to produce the same intensity at the light sensor 20 that was produced before the mean gap changed. The instrument would thus incorrectly indicate that the new mean gap between the probe tip and the target was the same as the original mean gap and the slope of the characteristic curve would be incorrect, so the instrument readings would be incorrect relative to one another as well as absolutely.

A setup system, shown in FIG. 1, includes a lamp intensity sensor 28 connected through the switch 24 to the lamp intensity regulator 13, a manual lamp intensity control 30, and a potentiometer 32 connected to the amplifier 26. To calibrate the instrument when it is initially installed, the switch 24 is moved from the position illustrated in FIG. 1 to the raised or set-up position in which the bottom lead from the amplifier 26 engages the grounded contact, and the lead from the lamp intensity sensor 28 is connected to the lamp intensity regulator 13. With the switch 24 in this position, the probe is moved to the position at which the amplitude of the output signal on the meter or oscilloscope 25 is a maximum. The light intensity of the lamp 10 is adjusted with the control 30 to give full scale output signal. The position of the probe 17 is readjusted to give a reading of about 40% on the scale, or midway in the linear portion of the curve A. The switch 24 is moved to the position shown in FIG. 1 and the potentiometer 32 is adjusted to give the same reading, about 40% on the scale, that the meter showed before the switch 24 was moved. The instrument is now calibrated and need not be readjusted.

In use, dynamic changes in the gap between the target 18 and the tip of the probe 17 will cause a change in the intensity of the light reflected back into the return fibers 19 of the cable 16, and will be reflected as a change in the electrical signal from the sensor 20, which is amplified and displayed or recorded on the device 25. The instrument is designed to ignore, or more exactly, correct for long term changes in reflected light intensity so that only the dynamic changes in gap dimension are displayed on the device 25. Long term changes, that is, those with a time constant of more than one second, include such changes as surface reflectivity of the target which can be caused by heating, lubricants, dirt or surface texture changes. These changes will cause a change in the intensity of the beam reflected back to the receiving fibers 19, which causes a change in the mean signal voltage seen by the regulator 13, which in turn causes a corresponding change in the intensity of the light from the lamp 10 until the mean signal from the sensor has returned to the correct predetermined value.

Obviously, numerous modifications and variations of the preferred embodiment are possible in view of this disclosure. For example, the manual adjustment of the lamp 10 during setup could be done automatically with a signal comparator comparing a reference voltage source against the output of the sensor 20, and generating an error signal to a servo to adjust the light intensity until the error signal is reduced to zero. Also, the potentiometer 32 could be replaced with an automatic reference voltage matching circuit that matches the reference voltage set up in the control 30 to eliminate the manual setting of the potentiometer 32. Moreover, the lamp intensity regulator could be replaced with a light limiting device such as an iris controlled by the light sensor 20, in which case the lamp 10 would merely have to maintain a constant light level.

It is thus to be expressly understood that these and other modifications, and their equivalents, may be practiced while remaining within the spirit and scope of my invention as defined in the following claims, wherein we claim:

1. In a fiber optic proximity measuring instrument for measuring the dynamic changes in the gap between a probe tip and a target, including a light source; a reflected light sensor; a fiber optic light conducting cable having light transmitting fibers for transmitting light from said light source to the probe tip, and having light receiving fibers for receiving light reflected from the target and conducting the reflected light to said reflected light sensor; and means for adjusting the intensity of the light entering said light transmitting fibers from said light source; wherein the improvement comprises:

- a lamp intensity sensor mounted in light receiving relation to said light source, and connected to a lamp intensity regulator in a set-up mode to control the intensity of said light source in accordance with the setting on a lamp intensity control to calibrate the instrument when it is first installed to establish a predetermined intensity of light received by said reflected light sensor;
- automatic light adjusting means for use when the mean gap is held constant during the measurement period, said means having a time constant at least ten times longer than the period of said dynamic changes, and including said light intensity regulator which, in an operating mode, is controlled by said reflected light sensor and is connected to said light source to adjust the mean intensity of the light received by said light sensor to said predetermined value;
- said light adjusting means including an adjustable voltage source which provides a reference, with relation to which said regulator maintains the intensity of said light source at a level at which the mean intensity of light received by said reflected light sensor is substantially equal to said predetermined value;
- switch means switchable between said set-up mode wherein said lamp intensity sensor is connected to said regulator during initial installation and calibration, and said operating mode wherein said reflected light sensor is connected to said regulator and said lamp intensity sensor is disconnected from said regulator, whereupon said regulator is controlled by said reflected light sensor;
- whereby said instrument will automatically adjust for changes in target surface reflectivity and light transmission efficiency by maintaining the mean intensity of reflected light received by the reflected light sensor originally established during set-up, while maintaining accurate measurement of the dynamic changes in said gap.

2. A fiber optic proximity sensor system for monitoring the vibrations in a rolling element bearing having an outer race, a relatively rotatable inner race, and a plurality of rolling elements between said inner and outer races, said system comprising:

- a bundle of light transmitting optical fibers having one end mounted in close proximity to one of said races, wherein the mean gap between said one end and said one race is held constant during the measuring period;
- a light source mounted in light transmitting relation to a first portion of said optical fibers, to generate light, which is tramsmitted through said first portion of said optical fibers to said one race;
- a regulator connected to said light source for regulating the intensity of light produced by said light source;
- a reflected light sensor mounted in light receiving relation to a second portion of said other end of said optical fibers to sense light reflect from said one race and returned through said second portion of said optical fibers to said light sensor, and to produce a first output signal indicative of the intensity of said sensed light;
- a lamp intensity sensor mounted in light receiving relation to said light source, and generating a second output signal indicative of the intensity of said light source;
- a lamp intensity control for adjusting the intensity of light from said light source to a level which produces a predetermined intensity of light at said reflected light sensor, to calibrate the instrument in set-up mode when it is first installed;
- conductors connected between said lamp intensity sensor and said regulator to conduct said second output signal to said regulator to control the intensity of said source;
- means for automatically regulating the intensity of said light source in operating mode to maintain constant the mean intensity of the light in said second portion of said optical fibers irrespective of surface reflectivity of the target;
- said means having a time constant at least ten times the period of the vibrations and including said lamp regulator connected between said lamp and said reflected light sensor and controlled by the mean signal originating from said reflected light sensor;
- said means including an adjustable voltage source which serves as a reference for said regulator to maintain said lamp intensity at a level which produces a mean light intensity at said reflected light sensor which is substantially equal to said predetermined intensity;
- switch means connected to said conductors for disconnecting said lamp intensity sensor from said regulator after initial installation and calibration in said set-up mode, and for connecting said reflected light sensor to said regulator when said lamp intensity sensor is disconnected from said regulator, whereupon said regulator is controlled by said reflected light sensor in said operating mode.

3. A method of automatically adjusting the light source in a fiber optic proximity measuring instrument having a light source, a probe for directing light from the light source toward an adjacent target and receiving light reflected off of the target, a cable of light conducting fibers connected to said probe containing fibers for conducting transmitted light to the probe and containing other fibers for conducting the returning light reflected off the target, back into the instrument, and to a light sensor which produces an electrical signal proportional to the light intensity and indicative of the gap, and a light regulator for regulating the intensity of light from said light source wherein the mean gap between the probe and the target is held constant during the measurement period, wherein the method comprises:

- sensing the intensity of the returning light and generating a sensor signal proportional to said intensity;
- adjusting said light source to an intensity that will produce a mean sensor signal of a predetermined value;
- producing a reference signal which is indicative of said predetermined value;
- comparing said sensor signal to a reference signal;
- generating an error signal when the difference between said sensor signal and said reference signal exceeds a certain value;

controlling said lamp regulator, having a time constant at least about one second, by said error signal to adjust the light intensity from said lamp to reduce said error signal to below said certain value.

4. In a fiber optic proximity measuring instrument for measuring the dynamic changes in the gap between a probe tip and a target when the mean gap is held constant during the measurement period, including: a lamp; a reflected light sensor, and a fiber optic light conducting cable having light transmitting fibers for transmitting light from said lamp to said probe tip, and having light receiving fibers for receiving light reflected from said target and conducting the reflected light to said reflected light sensor; wherein the improvement comprises:

a lamp power supply and a lamp power regulator;

a lamp power control connected to said regulator in a set-up mode for controlling the power to said lamp to calibrate the instrument by establishing a predetermined intensity of light received by said reflected light sensor;

automatic light adjusting means controlled, in an operating mode, by said reflected light sensor and connected to said lamp power regulator to adjust the intensity of the light produced by said lamp, said light adjusting means having a time constant at least ten times longer than the period of said dynamic gap changes and including an adjustable voltage source which provides a reference, with relation to which said regulator maintains the power to said lamp at a level at which the mean intensity of light received by said reflected light sensor is substantially equal to said predetermined value;

switch means switchable between said set-up mode wherein said lamp power control is connected to said regulator during calibration, and said operating mode wherein said reflected light sensor is connected to said regulator and said lamp power control is disconnected from said regulator, whereupon said regulator is controlled by said automatic light adjusting means;

whereby said instrument will automatically adjust for any change in the light path between and including said lamp and said reflected light sensor having a time constant exceeding ten times the period of said dynamic gap changes by maintaining the mean intensity of reflected light received by the reflected light sensor originally established during set-up, while maintaining accurate measurement of the dynamic changes in said gap.

* * * * *

UNITED STATES PATENT AND TRADEMARK OFFICE
CERTIFICATE OF CORRECTION

PATENT NO. : 4,254,331

DATED : March 3, 1981

INVENTOR(S) : Richard A. Dorman and Curtis D. Kissinger

It is certified that error appears in the above-identified patent and that said Letters Patent are hereby corrected as shown below:

Column 2, line 46, "23" should be --22--

Signed and Sealed this

Twenty-third Day of June 1981

[SEAL]

Attest:

RENE D. TEGTMEYER

Attesting Officer

Acting Commissioner of Patents and Trademarks